G. H. SUTCLIFFE.
MEANS FOR TAKING PHOTOGRAPHS WITH SPECIAL SCENIC OR BACKGROUND EFFECTS.
APPLICATION FILED DEC. 10, 1921.
1,418,033.
Patented May 30, 1922.
4 SHEETS—SHEET 1.
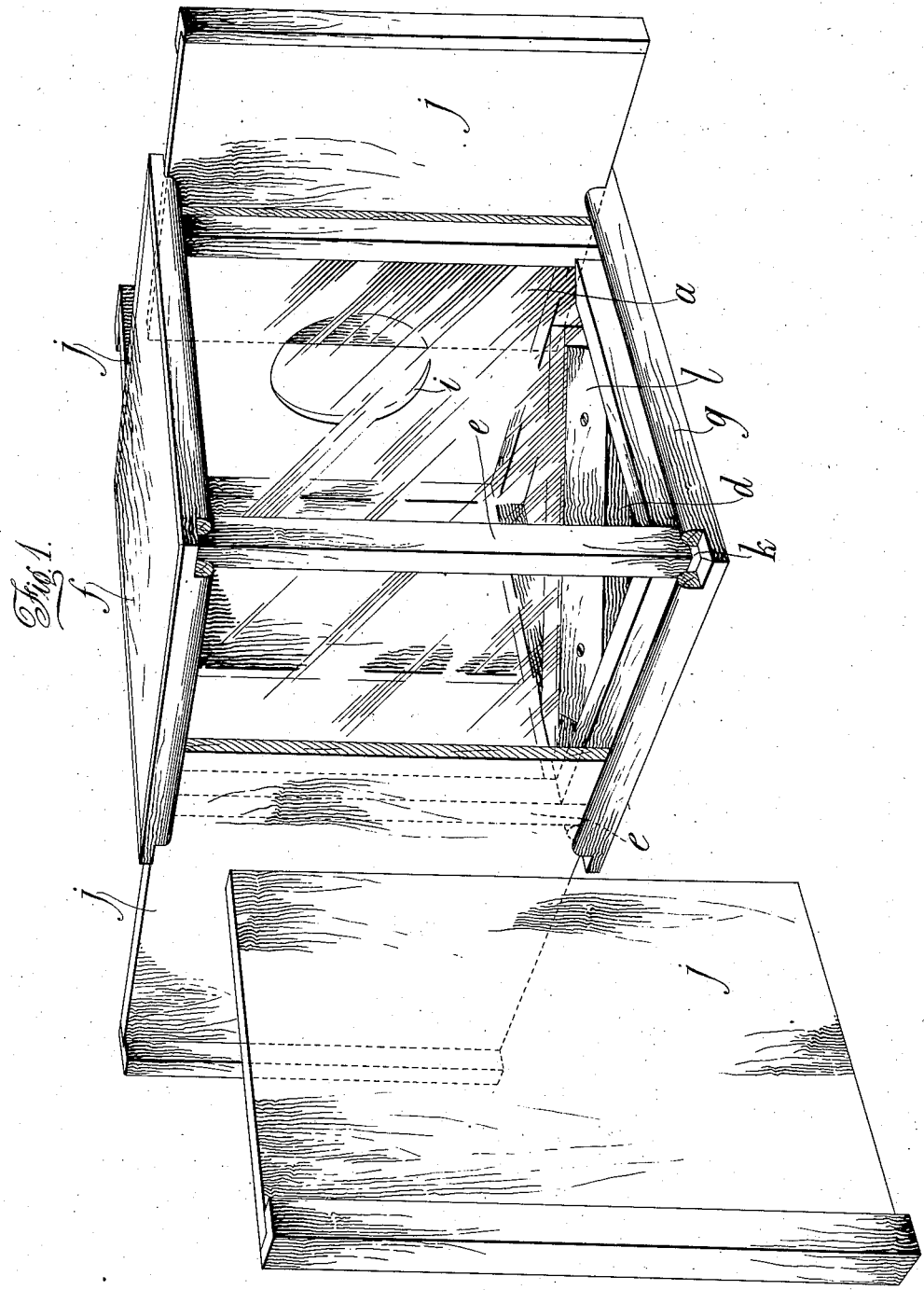
INVENTOR,
Godfrey H. Sutcliffe,
BY
E. G. Siggers.
ATTORNEY.

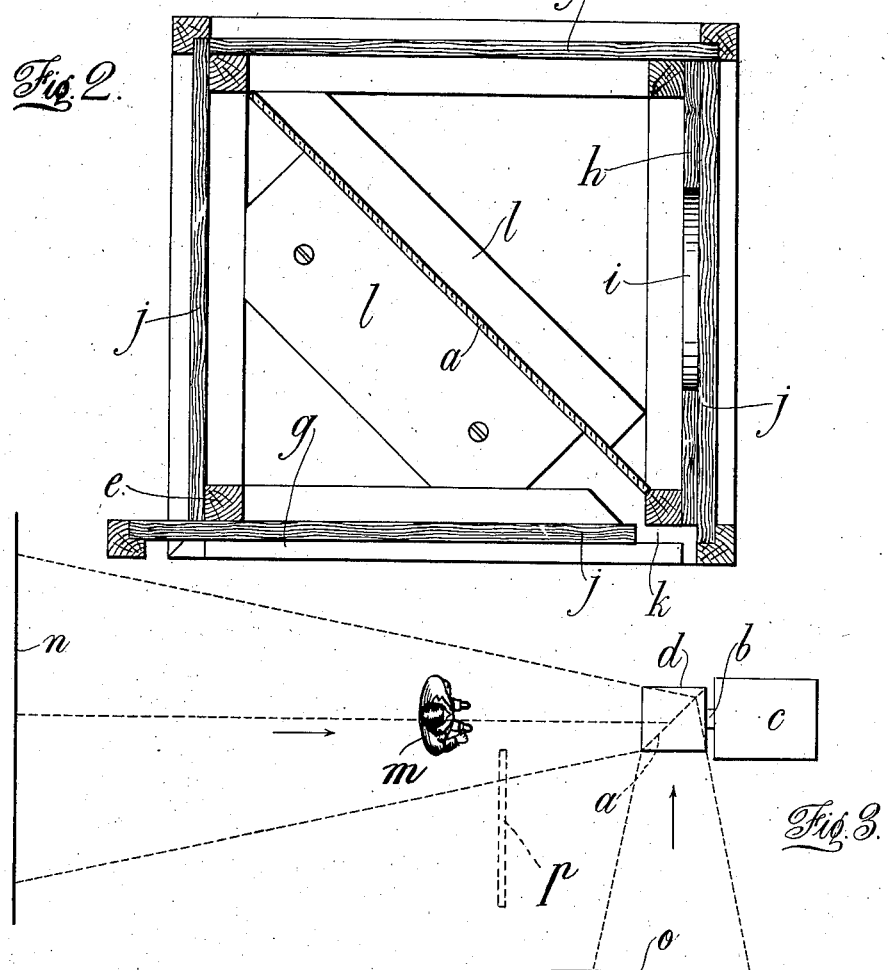
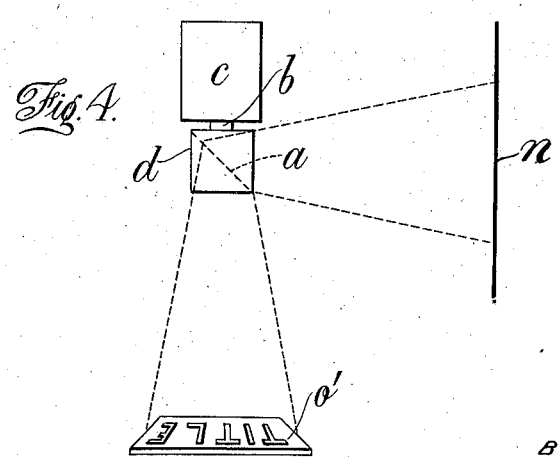

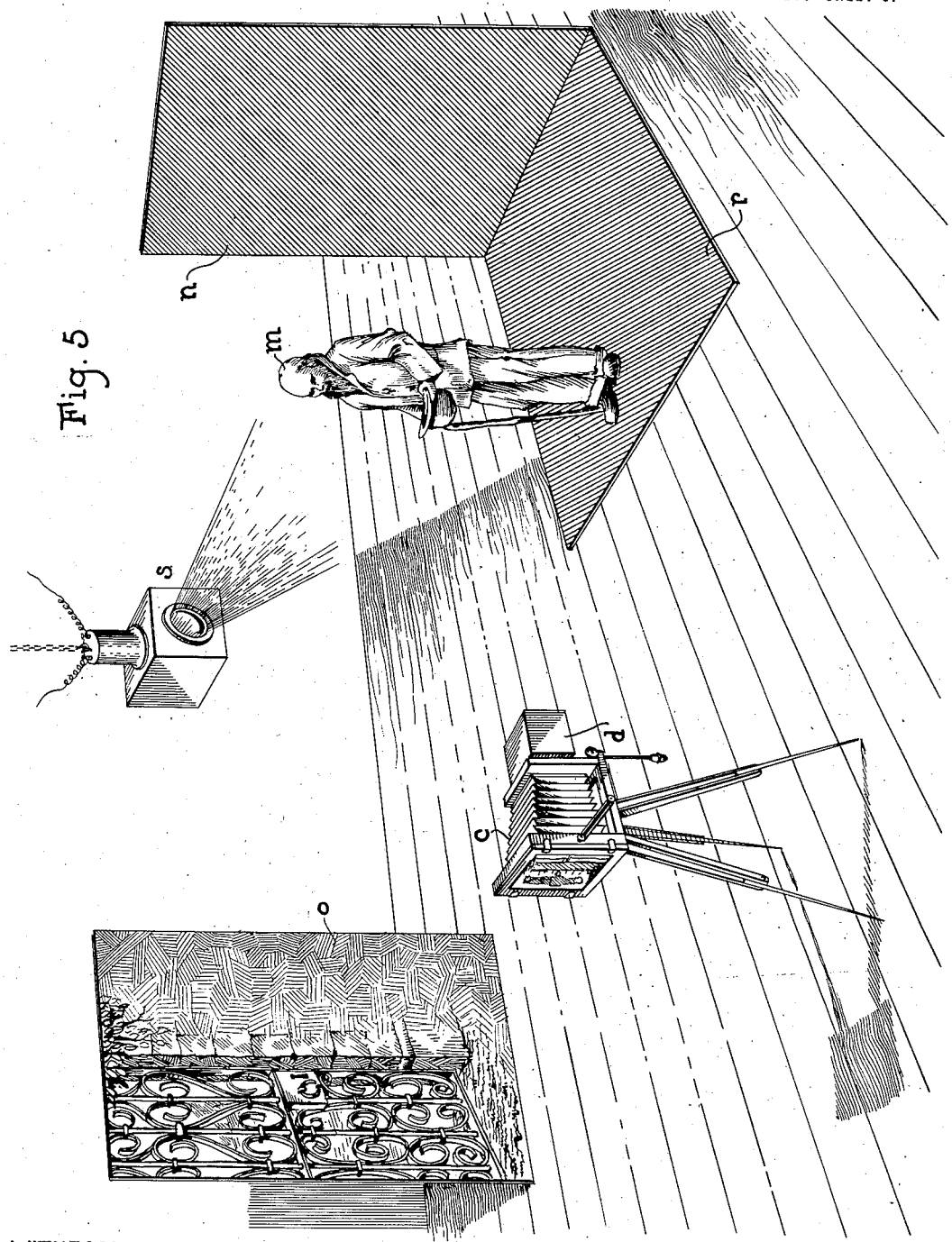

G. H. SUTCLIFFE.
MEANS FOR TAKING PHOTOGRAPHS WITH SPECIAL SCENIC OR BACKGROUND EFFECTS.
APPLICATION FILED DEC. 10, 1921.

1,418,033.  Patented May 30, 1922.
4 SHEETS—SHEET 4.

WITNESSES

G. H. Sutcliffe
INVENTOR

ATTORNEY

UNITED STATES PATENT OFFICE.

GODFREY HEATHCOTE SUTCLIFFE, OF WEST EALING, ENGLAND.

MEANS FOR TAKING PHOTOGRAPHS WITH SPECIAL SCENIC OR BACKGROUND EFFECTS.

1,418,033.   Specification of Letters Patent.   Patented May 30, 1922.

Application filed December 10, 1921. Serial No. 521,444.

*To all whom it may concern:*

Be it known that I, GODFREY HEATHCOTE SUTCLIFFE, British subject, and resident of West Ealing, in the county of Middlesex, Kingdom of England, have invented certain new and useful Means for Taking Photographs with Special Scenic or Background Effects, of which the following is a specification.

This invention relates to means for taking photographs with special scenic or background effects.

The object of this invention is to provide means whereby a background of any size or proportion in relation to the size of the objects or figures to appear in front of the said background can be photographed at the same time as the objects or figures by one exposure, the resultant effect being that the figures or objects appear in proportion to the view forming the background.

A further object of this invention is to provide improved means for taking either stationary or moving pictures whereby in one exposure, a background or the like and figures, objects or the like can be photographed to provide a natural or grotesque picture, the said background and figures or objects being of different proportionate sizes in relation to each other and arranged at different angular positions with respect to the camera employed for taking the picture.

A further object is to so arrange the background or the like that during the taking of the photograph of the figures or objects and the said background, the latter will be away from its normal position so that the said figures can be illuminated to a greater degree than the background, or vice versa thus enabling certain parts of the resultant picture to appear particularly prominent.

A further object is to so arrange the background or the like that the objects, figures or the like which are being photographed in connection therewith can during the taking of a moving picture appear to vanish or pass away to provide an illusion effect.

A further object is to so arrange the background that it may be a picture, painting or view of any size or colour or a screen upon which kinematograph pictures are adapted to be projected.

With this and other objects in view the invention consists in reflecting a stationary or moving picture, painting, or the like on to a transparent screen arranged adjacent to and at an angle of substantially 45 degrees to a camera and in front of the screen and camera are arranged the objects, figures or the like to be photographed, the said photographing of the background and objects being performed in one exposure.

The invention will now be described with reference to the accompanying drawings, in which:—

Figure 1 is a perspective view of one form of cabinet for use in conjunction with a camera.

Figure 2 is a sectional plan thereof.

Figures 3 and 4 are diagrams of the means employed for taking photographs.

Fig. 5 is a perspective view in detail of the apparatus diagrammatically shown in Fig. 3.

Figure 6:
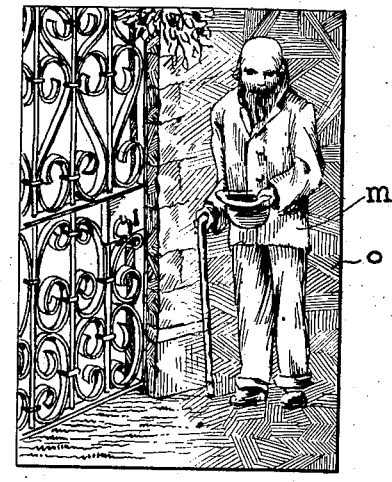
Fig. 6 is a view of a resultant picture taken by the apparatus shown in Fig. 5.

According to one form of this invention a screen of suitable transparent material $a$ such, for instance, as sheet or plate glass, is arranged at an angle of 45 degrees in front of and adjacent to the lens $b$ of a camera $c$ it is desired to employ to photograph figures or objects placed in front thereof. This transparent screen $a$ is preferably mounted in a suitable frame cabinet or the like $d$ which comprises a skeleton framework $e$ fitted with a top $f$ and bottom $g$. One side $h$ of the cabinet $d$ which is adapted to be placed adjacent to the camera $c$ may be enclosed and in such cases it is provided with an aperture $i$ of suitable size to permit the photograph to be taken by the lens $b$ of the said camera $c$. In use two sides of the cabinet $d$ are normally open, but in the construction shown they are adapted to be closed or partially closed by sliding panels $j$ mounted in suitable grooves or the like $k$ formed in the top and bottom covers $f$ and $g$ of the cabinet $d$. The top and bottom of the glass screen $a$ are preferably supported by suitable members $l$ secured to the top and bottom of the cabinet. In front of the cabinet $d$ and camera $c$ which latter is disposed a short distance to the rear of the said cabinet $d$, is arranged the object, figures or the like indicated at $m$ which it is desired to photograph. These objects $m$ are arranged at any suitable distance from the camera $c$ and in front of a background screen $n$ of opaque material such as a black or dark coloured screen. The floor $r$, (Fig. 5) upon which the objects are arranged is also of dark material. Means shown at $s$ are provided preferably at the sides of and in front of the screen $n$ to illuminate the objects or figures $m$ in any desired degree. The illuminating means are preferably so arranged that the light will not fall upon the darkened screen to the rear of the objects or figures. Any type of lamp for illuminating the object $m$ may be employed. It is preferable that the light shall not fall on the screen $n$ and in the perspective view shown in Fig. 5, the figure is arranged well in front of the screen, and in actual practice the screen would still be further away so as to be out of the focus of the camera. To one side of the cabinet $d$ is arranged a background $o$ which may be in the nature of a picture, painting or the like of any colour or size, or it may be in the nature of a moving picture. In this latter arrangement the background screen $o$ is preferably transparent so that moving pictures from a suitable kinematograph apparatus arranged at the rear thereof and therefore not seen in Fig. 5 may be projected thereon. The picture or the like which is adapted to constitute the background is suitably illuminated so that its reflection will be conveyed to the angularly arranged screen $a$ of the cabinet $d$. Thus when a photograph is taken by the camera $c$ a reproduction of the background $o$ reflected on the screen and the objects $m$ in front of the screen $n$ will be produced on the plate or the like in the said camera. It will thus be seen that a background $o$ can be of small size in proportion to the figures $m$ to be photographed. Upon one exposure of the plate a resultant picture $u$ will be reproduced of the figures together with the background or the like, as shown in Fig. 6. The camera employed may be an ordinary camera or one especially adaptable for taking kinematograph photographs in black and white or colours. In the latter cases the background $o$ may be movable or the objects or actors may be arranged to move in front of the darkened background $n$.

In order to take imaginative pictures, places or, for instance, visions or apparitions, a suitable opaque and darkened screen or the like indicated at $p$ in Figure 3 is arranged in front of the main darkened screen $n$ and to one side of, for instance, a figure indicated at $m$ being photographed. When it is desired to cause the figure to vanish during the taking of the photographs, the figure or the like moves or is caused to move to one side behind this auxiliary darkened screen $p$. Thus when the photographs taken by the camera are reproduced a very natural vanishing effecting will be apparent. It will be understood that the hereinbefore described apparatus may be employed to take photographs of various composite pictures and figures in a simple manner and by one exposure for each photograph and be equally efficient for producing ordinary photographs on various forms of background or for kinematography.

If desired, other effects may be arranged in front of the camera to combine with the background when the photographs are taken. For instance, as shown in Figure 4, the kinematograph camera $c$ and the cabinet $d$ are arranged in a vertical position to photograph a title $o'$ disposed on the floor and a scenic effect arranged on the screen $n$.

Figure 7:
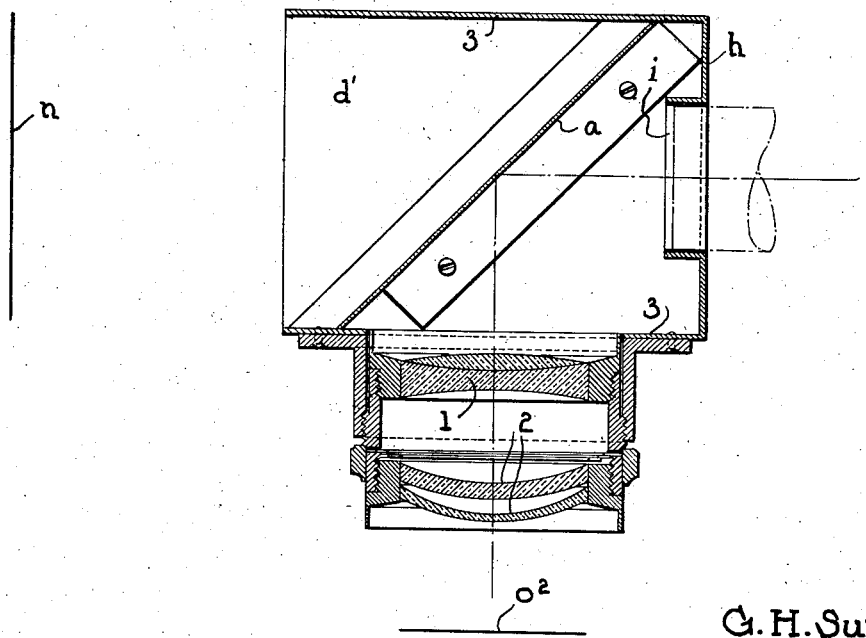
Fig. 7 is a horizontal section of a modified form of a cabinet equipped with a lens.

It will thus be seen that, for instance, people may be photographed together with backgrounds which are of reduced size and proportion, but by the above described means the resultant picture is such that this relative difference in proportion is rectified to provide natural pictures or varied to produce grotesque pictures, when employing a lens in the cabinet as disclosed by Fig. 7.

In cases where the background or picture to be reflected is too small to come within the range of the focus used on the figures, after necessary stopping down, a lens, or magnifying glass 1 and 2, as shown in Fig. 7 may be arranged between the reflector and the picture. The magnifying glass when such is employed is preferably arranged in one side of the cabinet. The focus of the picture is preferably adjusted to the focus of the camera.

In Fig. 7 is shown a cabinet $d'$ having a felt lined aperture $i$ formed in an end closure $h'$ for the reception of the lens of the camera. In the cabinet, which is square in cross section, is arranged a thin transparent screen $a$ which receives the reflection of anything opposite the lenses 1 and 2, which are shown as stigmatic, but any rectilinear type of lens may be used, provided its focus is sufficient to give the necessary size of reflection and covering power. This particular cabinet is shown in full size and is particularly designed for use in connection with cinematograph cameras. The screen $a$ is arranged at substantially an angle of 45 degrees to the axis of the camera, to the axis of the lenses 1 and 2, and to the sides 3 of the cabinet. An open end of the cabinet is opposite the screen $n$.

In Figs. 3, 4 and 5, and especially in studio work, when no auxiliary lens is employed to project the image of the picture or sceen $o$ or $o'$ on the plate $a$ in the cabinet, the object $m$ and the picture $o$ or $o'$ must be placed at equal distances from the ground glass in the camera $c$, in order to get proper results, but where such lenses as 1 and 2 of Fig. 7 are employed, the distance of the picture or screen $o^2$ from the camera will depend upon the lenses since these lenses are used to bring the background $o^2$ within the focus of the camera lens.

In Fig. 5, when $o$ is used as a screen in connection with a moving picture and an auxiliary lens is arranged in one side of the cabinet $d$, as illustrated by Fig. 7, the distance of the screen $o$ from the camera $c$ will depend upon the type of auxiliary lens employed to bring the picture of the screen $o$ within the focus of the camera lens.

By the use of an auxiliary lens in the cabinet $d$, small pictures or lantern slides $o^2$ as backgrounds may be brought into focus with an object $m$, twenty or thirty feet away from the camera, when the background $o^2$ is located but five or six inches from the reflector. Any well known means may be employed for properly adjusting the background $o^2$ relative to the reflector $a$.

When a figure is superimposed on a picture, it is necessary, unless special lighting arrangements are provided, to employ means to eliminate ghosting effects when the latter are not required. For instance, it will be noted that the picture or screen $o$ of Fig. 5 on the right hand side is tinted or darkened as is the screen $n$, so that the figure $m$ can be superimposed on the tinted or darkened portion of the picture $o$. These darkened portions of both the picture $o$ and screen $n$ are not illuminated; in fact, steps are taken to eliminate light especially on the screen.

Thus, this black portion of the screen will not be visible on the reflecting screen $a$, and, therefore, the object will be focused on the ground glass of the camera, and the reflected screen will not interfere with the focus.

By the medium of the auxiliary lenses in the cabinet $d$, any background with or without a ceiling may be effected on the resultant photograph or a ceiling alone may be arranged on the kinematograph picture scenes by reflecting the ceiling from the side onto the transparent screen $a$ by said lenses.

By this device, numerous combinations of pictures which formerly necessitated two distinct exposures may be taken by one exposure.

What I claim is:—

1. A portable device adapted to be used in connection with a camera for taking photographs with special scenic or background effects, comprising a supporting framework mounted adjacent the front end of the camera and having top and bottom closures, and a transparent screen arranged at an angle of substantially 45° to the axis of the camera and supported by the top and bottom closure.

2. A portable device adapted to be used in connection with a camera for taking photographs with special scenic or background effects, comprising a skeleton framework, top and bottom closures having grooves, a plurality of panels slidably mounted in said grooves, and a transparent screen arranged at an angle of substantially 45° in said device.

3. A portable device adapted to be used in connection with a camera for taking photographs with special scenic or background effects, comprising a skeleton framework, top and bottom closures having grooves, a plurality of panels slidably mounted in said grooves, and a transparent screen arranged at an angle of substantially 45° in said device, the rear side of the framework being closed by a panel provided with an aperture for the reception of the lens of the camera.

4. Means for taking photographs with special scenic or background effects, comprising a camera, a transparent screen arranged at an angle of substantially 45° to the longitudinal axis of the camera in front of said camera and in said axis, a black background arranged in front of said camera and screen and beyond the screen, and a picture comprising a scenic effect arranged at one side of said camera and screen in line for reflection on the screen.

5. Means for taking photographs with special scenic or background effects, comprising a camera, a transparent screen arranged at an angle of substantially 45° to the longitudinal axis of the camera and in front of said camera, a background arranged in front of said camera and screen, and a picture comprising a scenic effect arranged at one side of said camera and screen, the said background comprising a screen of substantially opaque material.

6. Means for taking photographs with special scenic or background effects, comprising a camera, a transparent screen arranged at an angle of substantially 45° to the longitudinal axis of the camera and in front of said camera, a background arranged in front of said camera and screen, a picture comprising a scenic effect arranged at one side of said camera and screen, and an auxiliary screen arranged in front of the background and of the same color as the background.

7. A portable device adapted to be used in connection with a camera for taking photographs with special scenic or background effects, comprising a transparent screen arranged at an angle of substantially 45° to the axis of the camera and located at some point along said axis in front of the sensitive plate of the camera, and an auxiliary lens arranged to one side of the transparent screen for projecting the special scenic effects onto said transparent screen.

8. A portable device adapted to be used in connection with a camera for taking photographs with special scenic or background effects, comprising a supporting frame mounted adjacent the front end of the camera, having top and bottom and side closures, and a transparent screen arranged at an angle of substantially 45° to the side closures, one of said side closures being provided with an opening, and a lens mounted on the side closure in alinement with the opening of said side closure.

9. Means for taking photographs with special scenic or background effects, comprising a camera, a transparent screen arranged at an angle of substantially 45° to the axis of the camera and in front of said camera, a background arranged in front of said camera and screen, a picture comprising a scenic effect arranged at one side of said camera and screen, and a lens mounted between the screen and scenic effect.

In testimony whereof I have hereunder signed my name.

GODFREY HEATHCOTE SUTCLIFFE.